(12) United States Patent
Koltze et al.

(10) Patent No.: US 6,223,512 B1
(45) Date of Patent: May 1, 2001

(54) POT SPINNING DEVICE

(75) Inventors: Karl Koltze, Mönchengladbach; Johan K. Fremerey, Bonn, both of (DE)

(73) Assignee: W. Schlafhorst AG & Co. (DE)

( * ) Notice: Subject to any disclaimer, the term of this patent is extended or adjusted under 35 U.S.C. 154(b) by 0 days.

(21) Appl. No.: 09/254,889
(22) PCT Filed: Aug. 26, 1997
(86) PCT No.: PCT/EP97/04655
  § 371 Date: Oct. 4, 1999
  § 102(e) Date: Oct. 4, 1999
(87) PCT Pub. No.: WO98/11284
  PCT Pub. Date: Mar. 19, 1998

(30) Foreign Application Priority Data
Sep. 13, 1996 (DE) .............................................. 196 37 270

(51) Int. Cl.⁷ ............................................................ D01H 1/08
(52) U.S. Cl. ..................................................... 57/67; 57/76
(58) Field of Search ...................... 57/67, 76; 310/90.5

(56) References Cited

U.S. PATENT DOCUMENTS

| | | | |
|---|---|---|---|
| 5,302,874 | * | 4/1994 | Pinkerton ........................... 310/90.5 |
| 5,590,515 | * | 1/1997 | Boden .................................... 57/264 |
| 5,720,160 | * | 2/1998 | Traxler .................................... 57/76 |
| 5,986,373 | * | 11/1999 | Stucker .............................. 310/90.5 |
| 6,035,620 | * | 3/2000 | Kallmann et al. ................... 57/58.49 |
| 6,109,014 | * | 8/2000 | Koltze .................................... 57/76 |

FOREIGN PATENT DOCUMENTS

| | | | |
|---|---|---|---|
| 11 04 653 B1 | 4/1961 | (DE) . | |
| 32 32 871 A1 | 3/1983 | (DE) . | |
| 33 41 716 A1 | 5/1984 | (DE) . | |
| 24 57 783 C2 | 10/1986 | (DE) . | |
| 38 44 563 | 10/1991 | (DE) . | |
| 42 08 039 A1 | 9/1993 | (DE) . | |
| 44 22 420 A1 | 1/1995 | (DE) . | |
| 39 13 053 C2 | 11/1995 | (DE) . | |
| 195 26 291 A1 | 1/1996 | (DE) . | |
| 195 20 144 A1 | 12/1996 | (DE) . | |
| 19715356 | * | 10/1998 | (DE) .............................. F16C/32/04 |
| 0 512 516 A1 | 11/1992 | (EP) . | |
| 959159 | * | 11/1999 | (EP) .............................. D01H/1/10 |
| 110 4653 | 2/1968 | (GB) . | |
| 57-186 619 A1 | 11/1982 | (JP) . | |

OTHER PUBLICATIONS
International Publication WO–A–94/25650 11/1994.

* cited by examiner

Primary Examiner—Rodney M. Lindsey
(74) Attorney, Agent, or Firm—Kennedy Covington Lobdell & Hickman, LLP

(57) ABSTRACT

The invention relates to a pot spinning device (2) having a spinning housing (16), a spinning centrifuge (11), which rotates at a high number of revolutions inside the spinning housing, as well as a rotatably seated centrifuge sheathing (20) arranged between the spinning housing and the spinning centrifuge, which is dragged along by the rotating spinning centrifuge (11) by means of air friction. In accordance with the invention, the spinning centrifuge (11) as well as the centrifuge sheathing (20) are seated in a contactless manner in magnetic bearings (31, 35, or respectively 18, 19).

22 Claims, 7 Drawing Sheets

POT SPINNING DEVICE

BACKGROUND OF THE INVENTION

The invention relates to a pot spinning device.

As in other spinning processes, the economy of the process in connection with centrifugal or pot spinning last but not least is a function of the required operating energy. In this connection it is known that a considerable portion of the expended operating energy is needed for overcoming the air friction occurring at the outer circumference of the spinning centrifuges in particular. This means that a large portion of the operating energy is converted into movement energy of the air surrounding the pot, which exhibits turbulent flow behavior at a number of revolutions of the spinning centrifuge of approximately 60,000 rpm.

Respective tests have shown that the required operating output increases, for example, with a power of three for the number of revolutions and with a power of four for the centrifuge diameter.

It was therefore already proposed in the past to have the spinning pot, which is also a name for the spinning centrifuge, run in as tight a spinning chamber as possible in order to reduce by this the air friction as a result of the turbulence.

A pot spinning device is known from German Patent Publication DE-AS 1 104 653, having a spinning pot rotating in a spinning chamber, wherein a rotatable intermediate housing is provided at a close distance between the spinning pot and the spinning chamber, and surrounds the greater portion of the spinning pot. The intermediate housing is rotatably seated by means of two rolling bearings and is taken along during the operation by the spinning pot, which rotates at a relatively high number of revolutions, so that the intermediate housing rotates at a lower number of revolutions than the spinning pot. This means that a difference in the number of revolutions is created between the intermediate housing and the stationary spinning chamber, which is clearly less than the number of revolutions of the driven spinning pot.

Since the air friction resistance occurring between the spinning pot and the intermediate housing, or respectively between the latter and the spinning chamber, remains comparatively low because of the clearly reduced differences in the number of revolutions, the drive output of the motor required for driving the spinning pot is reduced.

However, in connection with this known device it is disadvantageous that the spinning pot as well as the intermediate housing rotate in rolling bearings.

The frictional losses, which are unavoidable with rolling bearings, for example prevent the air friction occurring in the area of the rotating spinning pot from accelerating the intermediate housing to an optimal number of revolutions in regard to energy savings.

Moreover, limits have been set to rolling bearing technology in connection with pot spinning, last but not least because of the size of the required bearings, which is predetermined by the so-called characteristic number of revolutions value of these bearings. Here, the characteristic number of revolutions value is defined as the product of the number of revolutions in rpm and the diameter of the bearing in mm. The limits for such bearings primarily result from the large centrifugal force of the rolling bearings at the outer bearing ring, as well as the problematic lubrication of these bearings at high numbers of revolutions.

In connection with pot spinning it has also already been proposed to seat the spinning centrifuge in magnetic bearings.

German Patent Publication DE 42 08 039 A1 describes a pot spinning machine with spinning centrifuges seated in magnetic bearings.

In this known device the hollow-cylindrical spinning pots are kept suspended by the magnetic force. This means that magnetic bearings are provided at the respective ends of the spinning pots. Here, the magnetic bearings absorb the radial as well as the axial bearing forces. Moreover, sensors are provided in the area of the magnetic bearings for detecting radial deflections of the spinning pot. The results measured by these sensors are supplied to a position-regulating device assigned to the magnetic bearings, with the aid of which the position of the spinning pot can be stabilized.

A magnetic bearing for spinning centrifuges is also described in German Patent Publication DE 38 44 563 C.

In this known bearing, a permanent magnet gravity bearing is used for the machine element rotating at high speed, and a stabilizing bearing for the position regulation.

SUMMARY OF THE INVENTION

Based on pot spinning devices of the above described species, the invention is based on the object of further improving such pot spinning devices.

In accordance with the invention, this object is attained by a device as described in claim 1.

Advantageous embodiments of the invention are the subject of the dependent claims.

The embodiment in accordance with the invention of a pot spinning device allows the reduction of the difference in the number of revolutions between a spinning centrifuge and a centrifuge sheathing even at high numbers of revolution, i.e. a numbers of revolutions of a centrifuge>50,000 rpm. The centrifuge sheathing, which is dragged along by the spinning centrifuge by means of air friction and, like the spinning centrifuge, is magnetically seated, provides a clear relief of the air friction conditions, which during the operation of the pot spinning device in accordance with the invention is positively felt by a clear reduction of the required drive output.

Corresponding tests have shown that it is possible by means of the pot spinning device in accordance with the invention to achieve large numbers of revolutions on the one hand and, on the other hand, to clearly reduce the required drive energy in comparison with conventional pot spinning devices.

As shown in claim 2, at least the centrifuge sheathing is seated in magnetic bearings with a permanent magnet.

The embodiment recited in claim 3 is particularly advantageous, since magnetic bearings with a permanent magnet have the great advantage that they require no energy during the uninterrupted spinning process. Energy is only required for the electronic position-regulating device for compensating interfering forces. As a whole, the described bearing arrangement leads to a considerable reduction of the required drive energy.

By means of position-regulating devices as described in claim 6 it is possible to immediately and delicately adjust any position change of the rotating components, wherein the energy outlay required for this is relatively small.

In a preferred embodiment, the magnetic bearings with a permanent magnet for the centrifuge sheathing consist of a permanent magnet ring fixed in place in or on the spinning housing, which acts on an reciprocal pole ring arranged on the centrifuge sheathing (claim 7).

In this case, the centrifuge sheathing can be made from a non-magnetic material. As explained in claim 10, here the reciprocal pole ring is designed as a thin-walled ring, for example, made of a ferromagnetic material, for example steel.

In place of a cost-effective steel ring, the use of a second permanent magnet ring is also possible (claim 8). Relatively strong magnetic seating forces are obtained by the use of two permanent magnet rings, which has an advantageous effect on the running of the rotating body. If permanent magnet rings which repel each other (claim 9) are used, the position-regulating device is simplified.

If the centrifuge sheathing itself is made from a ferromagnetic material, it is possible to do without an additional reciprocal pole ring altogether, since in this case the entire centrifuge sheathing constitutes the reciprocal pole ring (claim 11).

The position-regulating device, which is required when using magnetic bearings with a permanent magnet, preferably has two control coils, which are arranged offset from each other and can be supplied with current in accordance with the occurring bearing deviation, if a radial position regulation is performed, as explained in claim 12. A position-regulating device of this type, which is connected to a control device, is cost-efficient and dependably assures that the rotating components are maintained in a stable center position during running.

As explained in claim 13, in this case the control coils are arranged orthogonally in respect to each other in an advantageous embodiment, since such an arrangement makes possible a two axis regulation in a relatively simple way.

As a variation of the embodiment described in claim 13, the embodiment disclosed in claim 14 is basically also conceivable.

The axial position-regulating device for the magnetic bearings of the spinning centrifuge advantageously has a ring-shaped control coil, which can be supplied with current. If needed, a strong and even axial force component can be generated by means of such a ring-shaped control coil (claim 15).

The advantageous embodiment described in claim 18 leads to the greatest possible self-centering of the spinning centrifuge. It is therefore possible to provide a position-regulating device only in the area of one of the magnetic bearings, which here preferably is constructed as a ring-shaped control coil, as described in claim 15.

The embodiment of the centrifuge sheathing explained in claim 19, has been shown to be particularly advantageous, since such an embodiment leads to the interruption of turbulent flow vortices which can occur on the exterior of a spinning centrifuge rotating at a high number of revolutions.

It furthermore has been shown that optimal results can be achieved with spacings as described in claim 20.

Further details and advantageous embodiments of the invention will be described in what follows by means of the drawings and the exemplary embodiments schematically represented therein.

BRIEF DESCRIPTION OF THE DRAWING

Shown are in.

Figure 1:
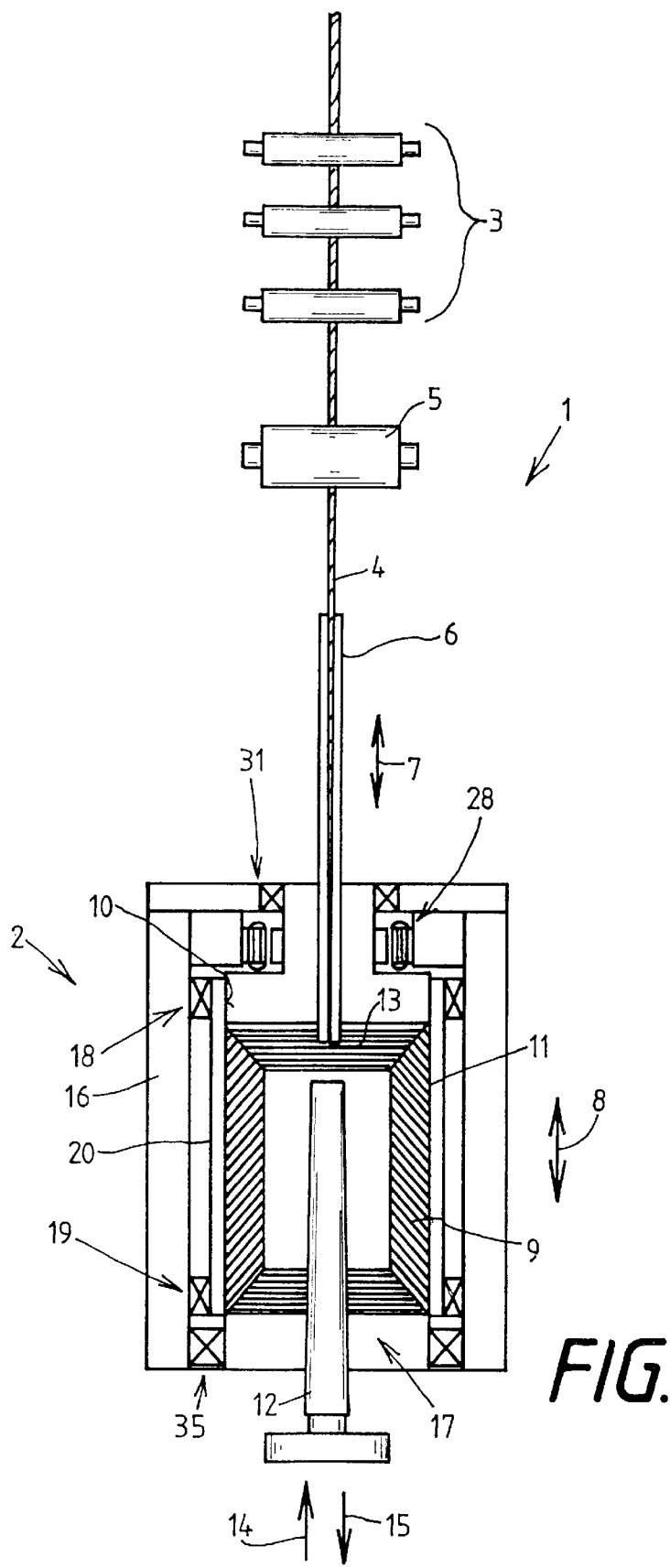
FIG. 1, a spinning station with a pot spinning device embodied in accordance with the invention in a largely schematic representation, FIG. 2, a longitudinal section of the pot spinning device embodied in accordance with the invention on a scale greatly enlarged in comparison with FIG. 1, FIG. 2a, a further embodiment of a pot spinning device with repellingly polarized permanent magnet rings for the magnetic seating of the centrifuge sheathing, FIG. 2b, a third embodiment of a pot spinning device with front magnetic seating and a centrifuge sheathing, FIG. 3, a schematic representation of a radial position-regulating device such as is used in the area of the magnetic bearings with a permanent magnet of the centrifuge sheathing, FIG. 4, a further embodiment of a radial position-regulating device, FIG. 5, a special embodiment of a centrifuge sheathing.

A spinning station, identified as a whole by the reference numeral 1, of a pot spinning machine, not shown in detail, is represented in FIG. 1.

DESCRIPTION OF THE PREFERRED EMBODIMENT

Figure 2:
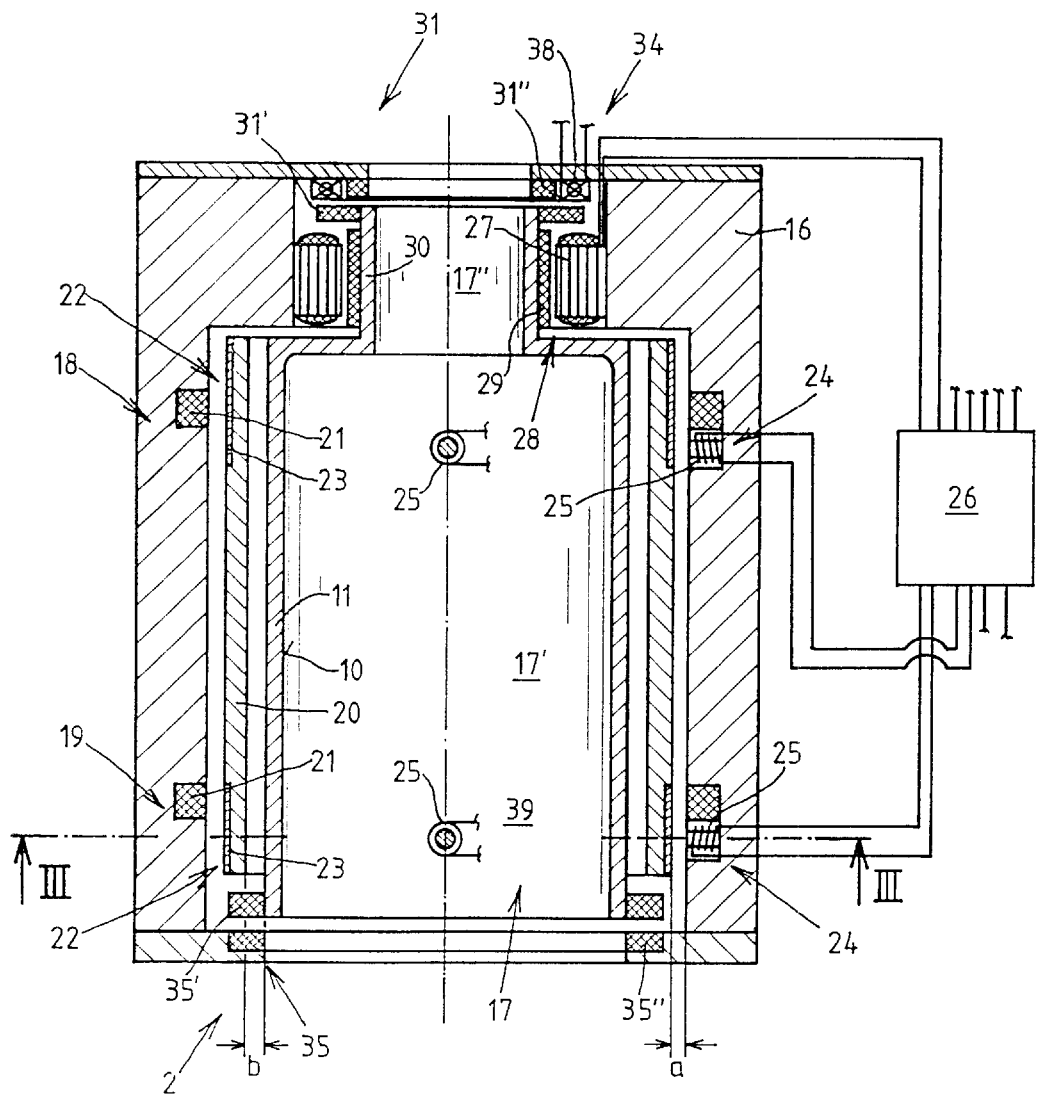

The pot spinning device 2, represented on a larger scale than in FIG. 1, is only shown in schematic cross section in FIG. 2, wherein only those components required for understanding the invention are represented and described.

It is known that as a rule such pot or centrifuge spinning machines have several spinning stations 1 with pot spinning devices 2.

As indicated, a drafting arrangement 3 is arranged above the pot spinning device 2, in which a sliver 4 is drafted. In this case the sliver 4 can be provided (not represented) either by spinning cans or speed frame bobbins. The drawn sliver 4 is conveyed via conveying rollers 5 to a yarn guide 6.

The yarn guide 6 is seated, movable in the direction of the two-headed arrow 7, and continuously performs a vertical shifting movement during the spinning process. Moreover, during the spinning process the spinning housing 16 of the pot spinning device 2 is slowly raised in the direction of the arrow 8, so that the sliver 4 exiting from the yarn guide mouth is spun and is deposited as a so-called yarn cake 9 on the interior wall 10 of the spinning centrifuge 11 rotating at a high number of revolutions.

When the yarn cake 9 has reached a predetermined size, a rewinding tube 12 is pushed (arrow 14), in the exemplary embodiment from below, into the path of the yarn leg 13 rotating between the yarn guide mouth and the yarn cake, and in this way the rewinding process is initiated, wherein the yarn of the yarn cake 9 is rewound on the rewinding tube 12.

At the same time, sliver feeding is stopped at the drafting arrangement 3.

The wound rewinding tube 12 is subsequently pulled downward (arrow 15) out of the pot spinning device 2 and is conveyed by means of a transport device (not represented) to a downstream-connected winding device, where the yarn of the rewinding tube is rewound to a large volume cheese.

As already mentioned, the pot spinning device 2 is represented in FIG. 2 on a larger scale than in FIG. 1.

The pot spinning device 2 has a spinning housing 16 having a stepped bearing opening 17 with a lower area 17', greater in diameter and length, and a narrower upper area 17". A spinning centrifuge 11 rotates at a high number of revolutions in the bearing opening 17 and is enclosed by a centrifuge sheathing 20. During the spinning process the spinning centrifuge 11, which is acted on by an electric motor drive 28, which is preferably designed as a permanent magnet synchronous motor, and rotates at a high number of revolutions in the spinning housing 16, drags along the centrifuge sheathing 20 by means of air friction. In this case the number of revolutions of the centrifuge sheathing 20 remains below the number of revolutions of the spinning centrifuge 11.

Magnetic bearings 18, 19 for seating the centrifuge sheathing 20 are arranged in the area 17' of the bearing opening 17. These magnetic bearings 18, 19, which preferably have permanent magnets, respectively consist of a permanent magnet ring 21 and of a reciprocal pole ring 22, fixed in place at a distance on the centrifuge sheathing 20.

If the centrifuge sheathing 20 is made of a non-magnetic material, as in the exemplary embodiment of FIG. 2, this reciprocal pole ring 22 is preferably embodied as a thin-walled, magnetizable steel ring 23. However, in such a case it is also possible to employ a second permanent magnet ring 21' as the reciprocal pole ring. A further option lies in making the centrifuge sheathing 20 itself from a ferromagnetic material, for example steel.

Figure 3:
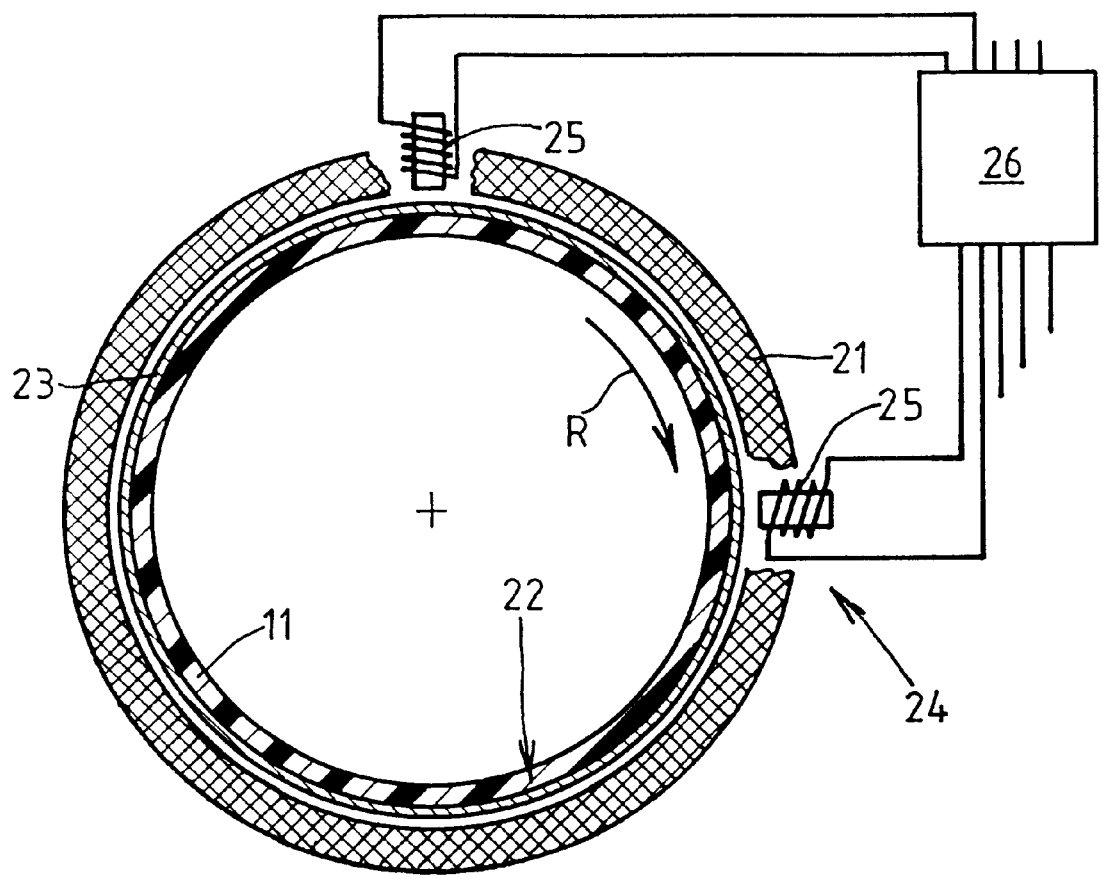
Figure 4:
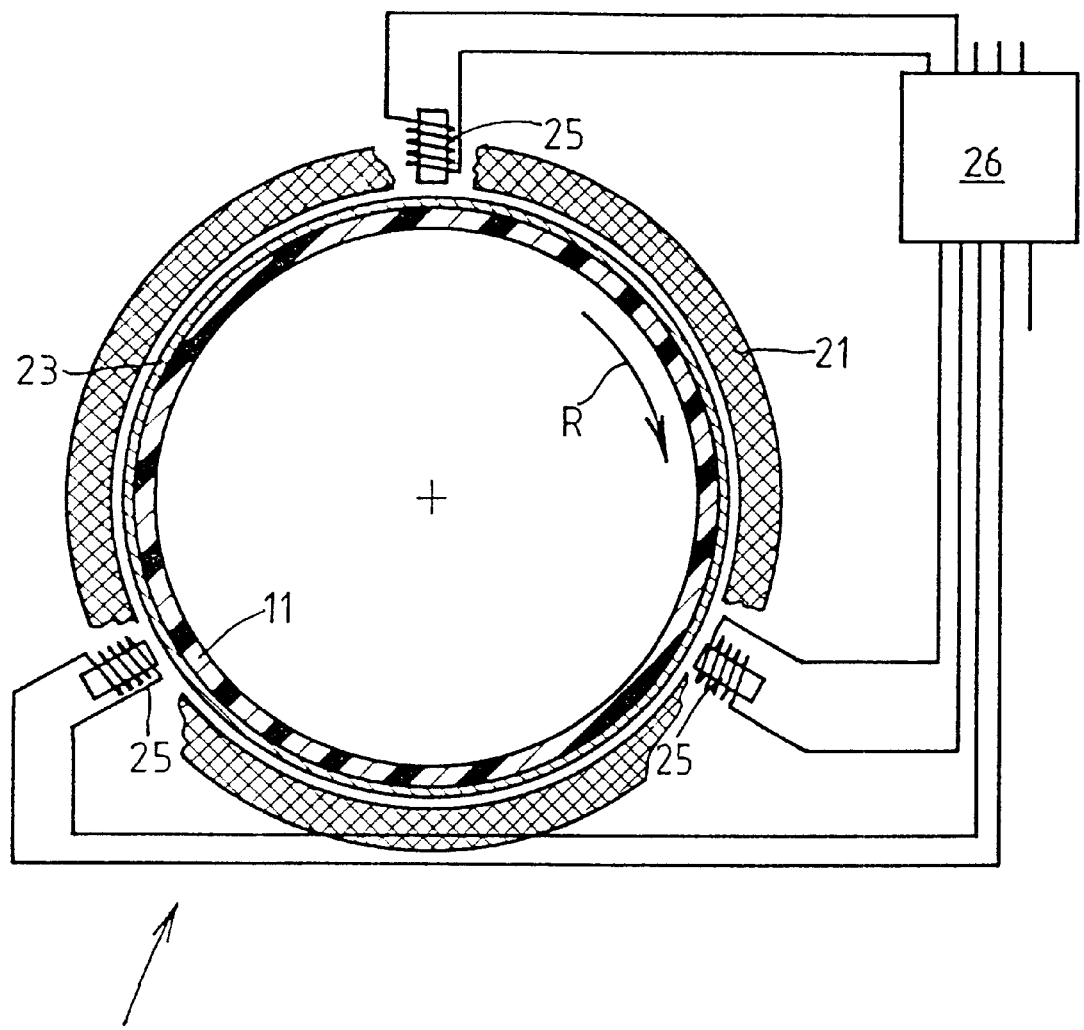

If two oppositely located permanent magnet rings 21 and 21' are employed (exemplary embodiment FIG. 2a), they can be embodied to be attracting each other. As in an reciprocal pole ring made of steel or the like, in this case position-regulating devices as represented in FIGS. 3 and 4 are also used. This means that a radial position-regulating device 24 is respectively provided in the area of the magnetic bearings 18, 19 or in the area of one of these magnetic bearings.

Preferably, the position-regulating device 24 (FIG. 3) has two control coils 25, which are orthogonally arranged and can be supplied with current and which, according to their control via the control device 26, generate a positive or a negative force component, so that the centrifuge sheathing 20 is maintained in a stable center position during its rotation.

The position-regulating device 24 represented in FIG. 4 has three control coils 25, which are arranged offset by 120°. The functioning of this arrangement is approximately comparable to the arrangement in accordance with FIG. 3.

The exact functioning of such position-regulating devices is known and described, for example, in German Patent Publication DE 42 08 039 A1, already mentioned at the outset, or in DE 17 50 602 B.

A Gramme coil, such as is known from German Paten Publication DE 22 13 465 A for magnetic bearings, can also be used advantageously.

Figure 2A:
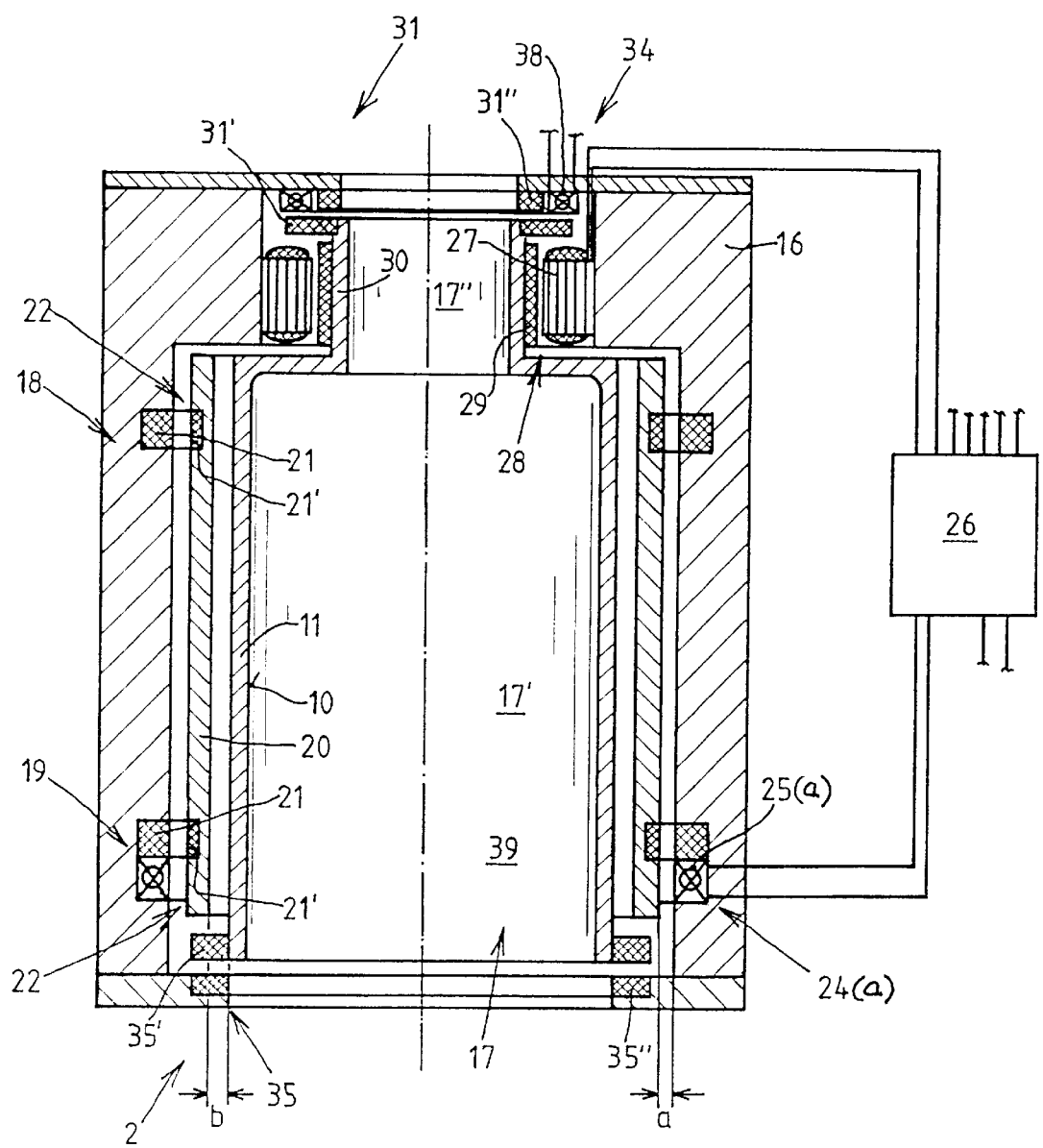

If, as indicated in the exemplary embodiment in FIG. 2a, respectively two repellingly polarized permanent magnets 21, 21' have been used as magnetic bearings, only one axially-acting stabilizing coil 25a is needed for the position-regulating device 24a.

Figure 2B:
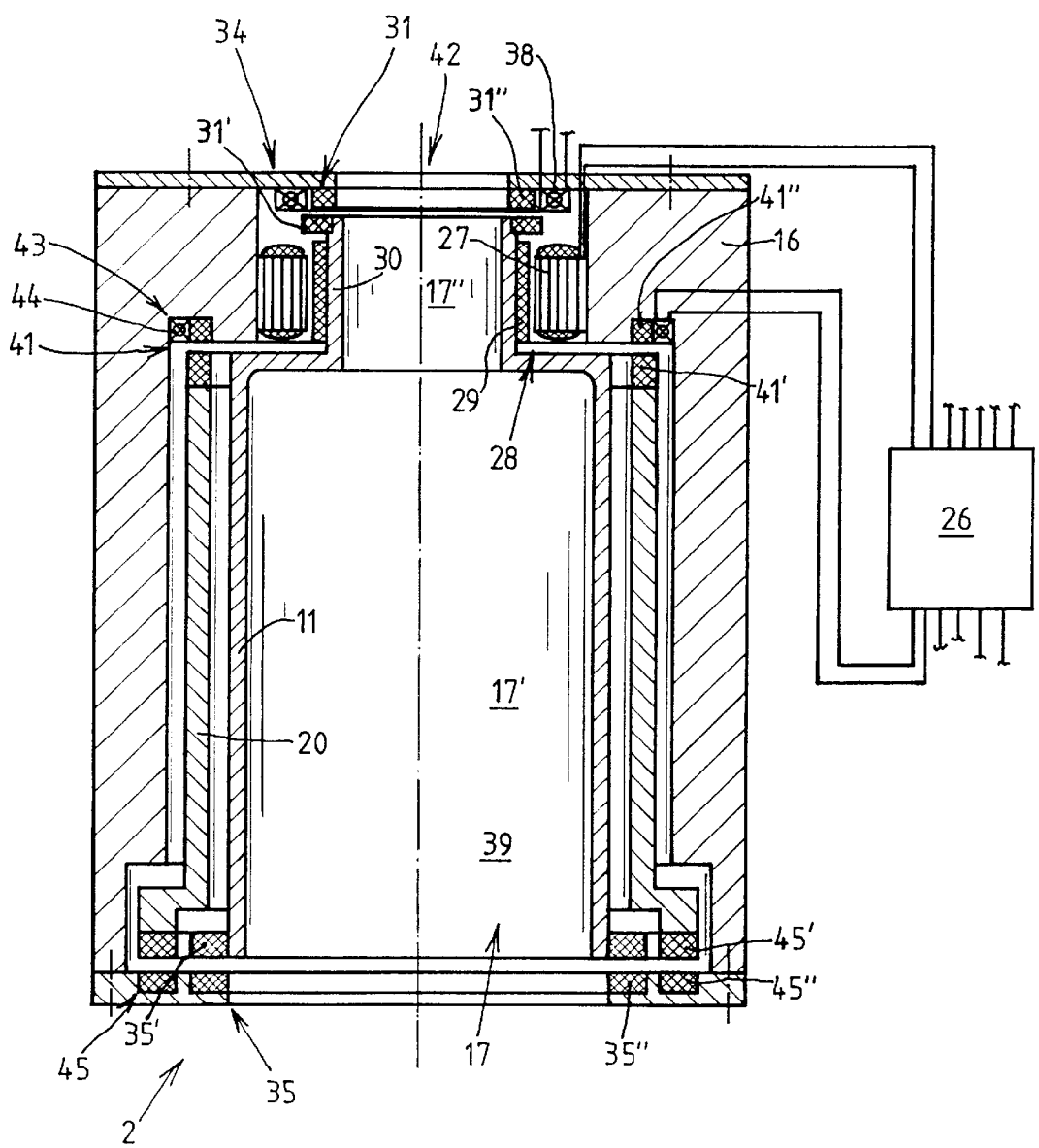

In FIG. 2b., magnetic bearings 31, 35 for the spinning centrifuge, or respectively magnetic bearings 41, 45 for the centrifuge sheathing, have been provided on the respective fronts of the spinning centrifuge 11 and the centrifuge sheathing 20. All four magnetic bearings are analogously embodied and on the magnet gap have oppositely located permanent magnet rings 31', 31", or respectively 35', 35", as well as 41', 41", or respectively 45', 45". Here, the permanent magnet rings 31', 35' as well as 41', 45' are fastened on the front sides of the spinning centrifuge 11, or respectively of the centrifuge sheathing 20, the permanent magnet rings 31", 35" and 41", 45" are attached to the spinning housing 16 of the pot spinning device 2.

In this case the permanent magnet rings located opposite each other are attractingly polarized. Respective position-regulating devices 34, or respectively 43, are located on the front sides of the spinning centrifuge and the centrifuge sheathing for the axial stabilization of the magnetic bearings 31, 35, or respectively 41, 45. These position-regulating devices have ring-shaped control coils 38, or respectively 44.

In the exemplary embodiments in accordance with FIGS. 2, 2a, 2b, the stator of an electromagnetic drive 28, for example a permanent magnet synchronous motor, is arranged respectively in the stepped, smaller area 17" of the bearing opening 17 of the spinning housing 16. As represented in the drawing figures, the electromotive drive 28 is preferably also connected to the control device 26.

Here, the rotor 29 of this rotary current motor 28 is fixed in place against the neck-like shoulder 30 of the spinning centrifuge 11. Such an arrangement has the result that the exterior diameter of the spinning centrifuge 11 is clearly reduced in comparison to the devices known, for example, from German Patent Publication DE 42 08 039 A1, which also has a positive effect on the required drive energy, as already mentioned in the preamble to the specification.

In FIG. 2, as in FIGS. 2a, 2b, a permanent magnet ring 31' of a magnet bearing 31 with a permanent magnet is arranged on the neck-like shoulder 30 of the spinning centrifuge 11. The permanent magnet ring 31' corresponds with a respective permanent magnet ring 31" fixed in place on the spinning housing 16. In this case the magnetic alignment of the permanent magnet rings 31', 31" is such, that opposite poles are placed opposite each other, i.e. that an attracting magnetic force arises. Moreover, an axial position-regulating device 34 is arranged in the area of the magnetic bearing 31. Preferably the axial position-regulating device 34 has a ring-shaped control coil 38, which can be supplied with current and is also connected with the controlled device 26.

The spinning centrifuge 11 is furthermore seated on its lower end in a magnetic bearing 35 which, the same as the magnetic bearing 31, is embodied as a magnetic bearing with oppositely located permanent magnet ring, wherein a permanent magnet ring 35' arranged on the spinning centrifuge 11 corresponds with a permanent magnet ring 35" at the spinning housing 16. With this magnetic bearing the magnetic alignment of the permanent magnet rings 35', 35" also is such that an attracting magnetic force arises.

As can be seen from FIG. 2b, such magnetic bearings are also suitable for the seating of the centrifuge sheathing 20.

The invention is not limited to the above described exemplary embodiments, further variations, for example in respect to the design of the centrifuge sheathing 20, are easily conceivable without departing from the general concept of the invention, which essentially consists of the magnetic seating of the spinning centrifuge 11 and the centrifuge sheathing 20.

Figure 5:
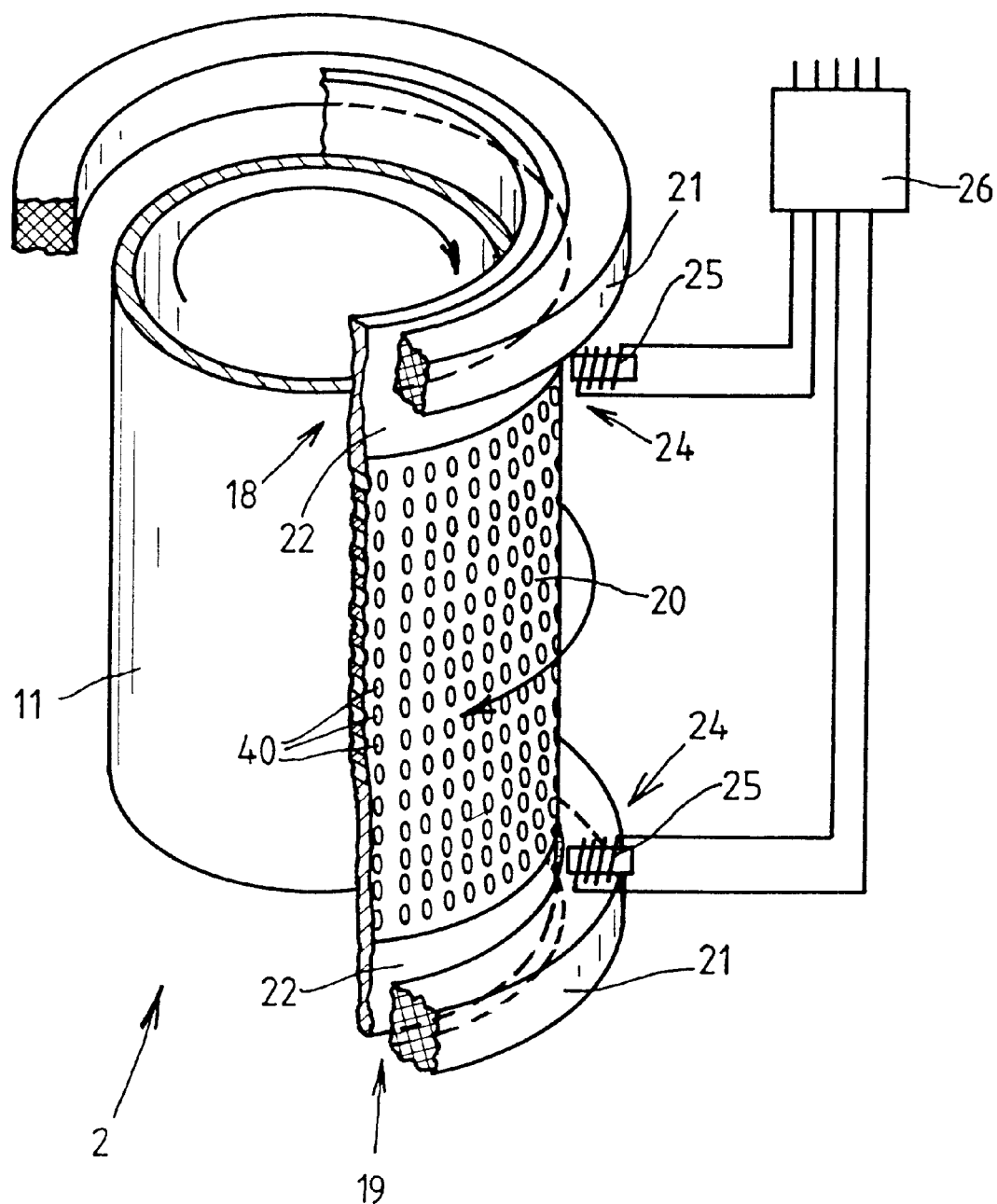

For example, a spinning centrifuge 11 with a centrifuge sheathing 20 is represented in FIG. 5, which has a structured sheathing. This means that the sheathing has structured elements, preferably periodically arranged bores 40, by means of which the turbulent flow occurring in the area of the surface during the rotation of the spinning centrifuge 11, which rotates at a high number of revolutions, is interrupted. A sheathing 20, structured in this way, for the spinning centrifuge 11 is known from International Patent Publication WO 96/08658.

What is claimed is:

1. A pot spinning device having a spinning housing, a spinning centrifuge, which rotates at a high number of revolutions inside the spinning housing, as well as a rotatably seated centrifuge sheathing arranged between the spinning housing and the spinning centrifuge, which is dragged along by the rotating spinning centrifuge by means of air friction, characterized in that the spinning centrifuge (11) and the centrifuge sheathing (20) are respectively seated in magnetic bearings (31, 35, or respectively 18, 19 41, 45).

2. The pot spinning device in accordance with claim 1, characterized in that at least one magnetic bearing (18, 19, 41, 45) for the centrifuge sheathing (20) is designed as a magnetic bearing with a permanent magnet.

3. The pot spinning device in accordance with claim 1, characterized in that the magnetic bearings (31, 35) for the spinning centrifuge (11) as well as the magnetic bearings (18, 19, 41, 45) for the centrifuge sheathing (20) are designed as magnetic bearings with a permanent magnet.

4. The pot spinning device in accordance with claim 1, wherein the spinning centrifuge (11) has a front side with a permanent magnet ring (31', 35') disposed thereon opposite a respective attractingly polarized permanent magnet ring (31", 35") on the spinning housing (16).

5. The pot spinning device in accordance with claim 1, wherein the centrifuge sheathing (20) has a front side with a permanent magnet ring (41', 45') disposed thereon opposite a respective attractingly polarized permanent magnet ring (41", 45") on the spinning housing (16).

6. The pot spinning device in accordance with claim 1, wherein at least one of the magnetic bearings (31, 35) for the spinning centrifuge (11) has an axial position-regulating device (34), and at least one of the magnetic bearings (18, 19) for the centrifuge sheathing (20) has a radial position-regulating device (24).

7. The pot spinning device in accordance with claim 3, characterized in that the magnetic bearings (18, 19) with a permanent magnet for the centrifuge sheathing (20) respectively consist of a permanent magnet ring (21) fixed in place in/on the spinning housing (16), and of a spaced apart reciprocal pole ring (22) arranged on the centrifuge sheathing (20).

8. The pot spinning device in accordance with claim 7, characterized in that the magnetic bearings (18, 19) each include two permanent magnet rings (21, 21'), wherein the permanent magnet ring (21) is fixed in place in/on the spinning housing (16), while the permanent magnet ring (21') constituting the reciprocal pole ring is arranged on the centrifuge sheathing (20).

9. The pot spinning device in accordance with claim 8, characterized in that the permanent magnet rings (21, 21') which are opposite each other in the magnetic bearings (18, 19) are repellingly polarized.

10. The pot spinning device in accordance with claim 7, characterized in that a thin-walled steel ring (23) is provided as the reciprocal pole ring (22), which is fastened in/on the centrifuge sheathing (20) made of a non-magnetic material.

11. The pot spinning device in accordance with claim 7, characterized in that the reciprocal pole ring (22) of the magnetic bearings (18, 19) is constituted directly by the centrifuge sheathing (20) made of a ferro-magnetic material.

12. The pot spinning device in accordance with claim 6, characterized in that the radial position-regulating device (24) comprises at least two control coils (25), which are arranged offset and can be supplied with current.

13. The pot spinning device in accordance with claim 12, characterized in that the control coils (25) are arranged orthogonally in respect to each other.

14. The pot spinning device in accordance with claim 6, characterized in that the radial position-regulating device (24) has three control coils (25), which are preferably arranged offset by about 120°.

15. The pot spinning device in accordance with claim 6, characterized in that the axial position-regulating device (34) for the spinning centrifuge (11) has a ring-shaped control coil (38), which can be supplied with current.

16. The pot spinning device in accordance with claim 1, characterized in that the spinning centrifuge (11) has a neck area (30) of reduced diameter, as well as a spinning area (39) enclosed by the centrifuge sheathing (20), wherein an electromotive individual drive (28) is arranged in the neck area (30).

17. The pot spinning device in accordance with claim 16, characterized in that the electromotive individual drive (28) is designed as a permanent magnet synchronous motor.

18. The pot spinning device in accordance with claim 16, wherein the magnetic bearings (31, 35) for the spinning centrifuge (11) are arranged at an edge of the neck area (30), and at an edge of the spinning area (39), the magnetic bearings having permanent magnet rings (31', 31", or respectively 35', 35") arranged opposite each other.

19. The pot spinning device in accordance with claim 1, wherein the centrifuge sheathing (20) has a structured element.

20. The pot spinning device in accordance with claim 1, wherein a radial distance (a) between the centrifuge sheathing (20) and the spinning housing (16) is approximately 2 mm, and a radial distance (b) between the centrifuge sheathing (20) and the spinning centrifuge (11) is approximately 2 mm.

21. The pot spinning device in accordance with claim 6, wherein a Gramme coil is used for position regulation.

22. The pot spinning device in accordance with claim 19, wherein the structured element comprises at least one bore (40).

* * * * *